United States Patent [19]
Morriss et al.

[11] Patent Number: 5,621,901
[45] Date of Patent: Apr. 15, 1997

[54] METHOD AND APPARATUS FOR SERIAL BUS ELEMENTS OF AN HIERARCHICAL SERIAL BUS ASSEMBLY TO ELECTRICALLY REPRESENT DATA AND CONTROL STATES TO EACH OTHER

[75] Inventors: Jeff C. Morriss, Boulder Creek; Andrew M. Volk, Loomis, both of Calif.

[73] Assignee: Intel Corporation, Santa Clara, Calif.

[21] Appl. No.: 332,337

[22] Filed: Oct. 31, 1994

[51] Int. Cl.$^6$ .................................................. G06F 13/40
[52] U.S. Cl. ........................................................ 395/306
[58] Field of Search .............................. 395/306, 200.13; 341/143

[56] References Cited

U.S. PATENT DOCUMENTS

| | | | |
|---|---|---|---|
| 3,245,045 | 4/1966 | Randlev . | |
| 3,916,387 | 10/1975 | Woodrum | 340/172.5 |
| 4,070,704 | 1/1978 | Calle et al. | 395/200.2 |
| 4,092,491 | 5/1978 | Frazer | 178/67 |
| 4,409,656 | 10/1983 | Andersen et al. | 395/280 |
| 4,606,052 | 8/1986 | Hirzel et al. | 375/87 |
| 4,660,141 | 4/1987 | Ceccon et al. | 395/200.3 |
| 4,689,740 | 8/1987 | Moelands et al. | 395/200.01 |
| 4,748,346 | 5/1988 | Emori | 307/270 |

(List continued on next page.)

OTHER PUBLICATIONS

Philips'I C (Inter–Integrated Circuit) Bus, 5 pages.
Concentration Highway Interface (CHI) AT&T Microelectronics Interface Specification, Nov. 1990 (DS90–124SMOS).
ATA/ANSI 878.1, Version 1.9 (59 Sheets), Copyright 1992 ARCNET Trade Association.
PCMCIA PC Card Standard, Release 2.01, 1.1 –4.8.9, Copyright 1992 PCMCIA.
Access.bus™ Specifications –Version 2.2.
High Performance Serial Bus, P1394/Draft 6.2v0, Copyright 1993 IEEE.

*Primary Examiner*—Ayaz R. Sheikh
*Attorney, Agent, or Firm*—Blakely, Sokoloff, Taylor & Zafman

[57] ABSTRACT

Circuitry and complementary logic are provided to a bus controller, a number of 1:n bus signal distributors, and a number of bus interfaces of an hierarchical bus assembly for electrically representing data and control states each other. The hierarchical serial bus assembly is used to serially interface a number of isochronous and asynchronous peripherals to the system unit of a computer system. The serial bus elements are interconnected to each other using low cost two wire signal cable. Electrical signals are propagated between the serial bus elements in a differential manner. These circuitry and complementary logic of the serial bus elements jointly implement inference of data and control states from the states and/or durations of the propagating electrical signals.

25 Claims, 16 Drawing Sheets

| DATA AND CONTROL STATES | ELECTRICAL REPRESENTATION |
|---|---|
| CONNECT | V+ and V– >Vse0 for 16 bit times |
| DISCONNECT | V+ and V– < Vse0 for 16 bit times |
| START OF PACKET | V+ and V– < Vse0 for 3 bit times |
| END OF PACKET | V+ and V– < Vse0 for 1 bit times |
| LOGICAL "1" | (V+) – (V–) > VDiff |
| LOGICAL "0" | (V+) – (V–) < VDiff |

U.S. PATENT DOCUMENTS

| | | | |
|---|---|---|---|
| 4,860,314 | 8/1989 | Boisson | 341/143 |
| 4,885,742 | 12/1989 | Yano | 370/85.2 |
| 4,893,123 | 1/1990 | Boisson | 341/143 |
| 4,912,633 | 3/1990 | Schweizer et al. | 395/200.01 |
| 4,914,650 | 4/1990 | Sriram | 370/60 |
| 4,984,190 | 1/1991 | Katori et al. | 395/200.01 |
| 5,001,707 | 3/1991 | Kositpaiboon | 370/94.1 |
| 5,063,574 | 11/1991 | Moore | 375/27 |
| 5,130,983 | 7/1992 | Heffner, III | 370/85.8 |
| 5,137,939 | 8/1992 | Abadi et al. | 380/25 |
| 5,179,670 | 1/1993 | Farmwald et al. | 395/222 |
| 5,237,690 | 8/1993 | Bealkowaski et al. | 395/700 |
| 5,257,160 | 10/1993 | Yokohama et al. | 361/246 |
| 5,269,011 | 12/1993 | Yanai et al. | 395/425 |
| 5,282,202 | 1/1994 | Bernstein et al. | 370/94.1 |
| 5,317,597 | 5/1994 | Eisele | 375/36 |
| 5,341,131 | 8/1994 | Hoshino et al. | 340/825.21 |
| 5,341,480 | 8/1994 | Wasserman et al. | 395/325 |
| 5,361,261 | 11/1994 | Edem et al. | 370/85.3 |
| 5,379,384 | 1/1995 | Solomon | 395/325 |
| 5,386,567 | 1/1995 | Lien et al. | 395/700 |
| 5,394,556 | 2/1995 | Oprescu | 395/800 |
| 5,418,478 | 5/1995 | Van Brunt et al. | 326/86 |
| 5,440,181 | 8/1995 | Gruender, Jr. et al. | 307/156 |
| 5,440,556 | 8/1995 | Edem et al. | 370/79 |
| 5,446,765 | 8/1995 | Leger | 375/359 |
| 5,463,620 | 10/1995 | Sriam | 370/60 |
| 5,463,624 | 10/1995 | Hogg et al. | 370/85.6 |
| 5,483,518 | 1/1996 | Whetsel | 370/13 |

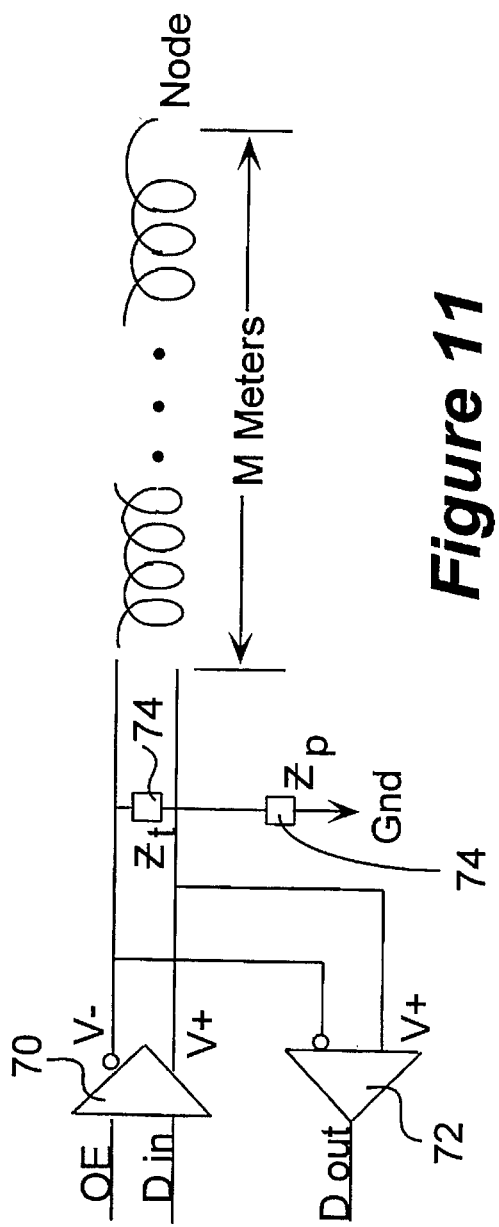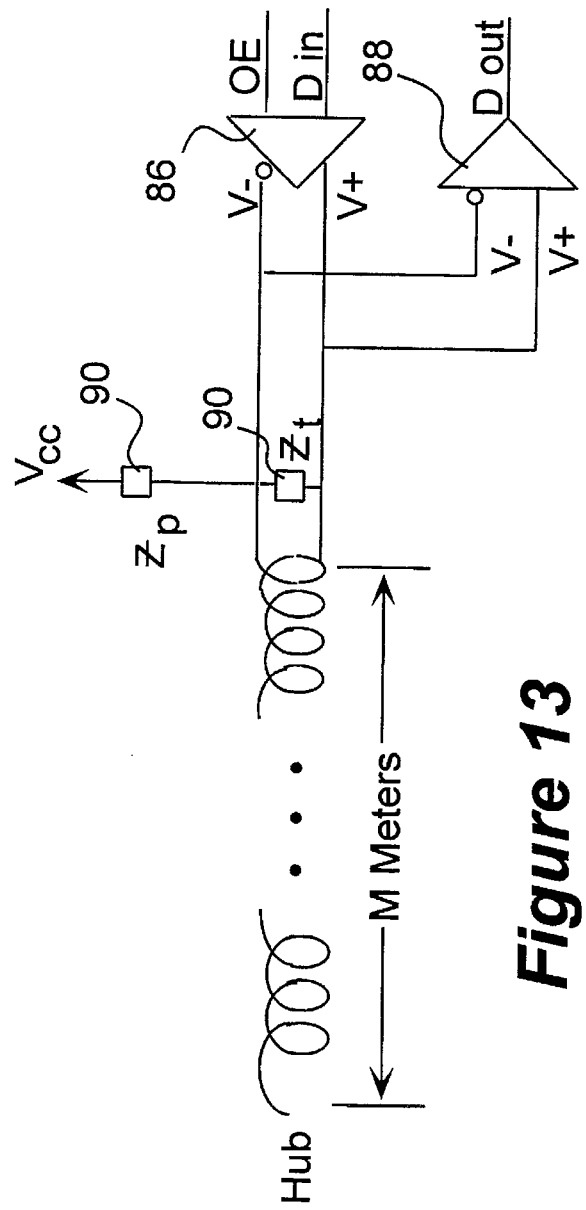

| DATA AND CONTROL STATES | ELECTRICAL REPRESENTATION |
|---|---|
| CONNECT | V+ and V– –>Vse0 for 16 bit times |
| DISCONNECT | V+ and V– < Vse0 for 16 bit times |
| START OF PACKET | V+ and V– < Vse0 for 3 bit times |
| END OF PACKET | V+ and V– < Vse0 for 1 bit times |
| LOGICAL "1" | (V+) – (V–) > VDiff |
| LOGICAL "0" | (V+) – (V–) < VDiff |

*Figure 14*

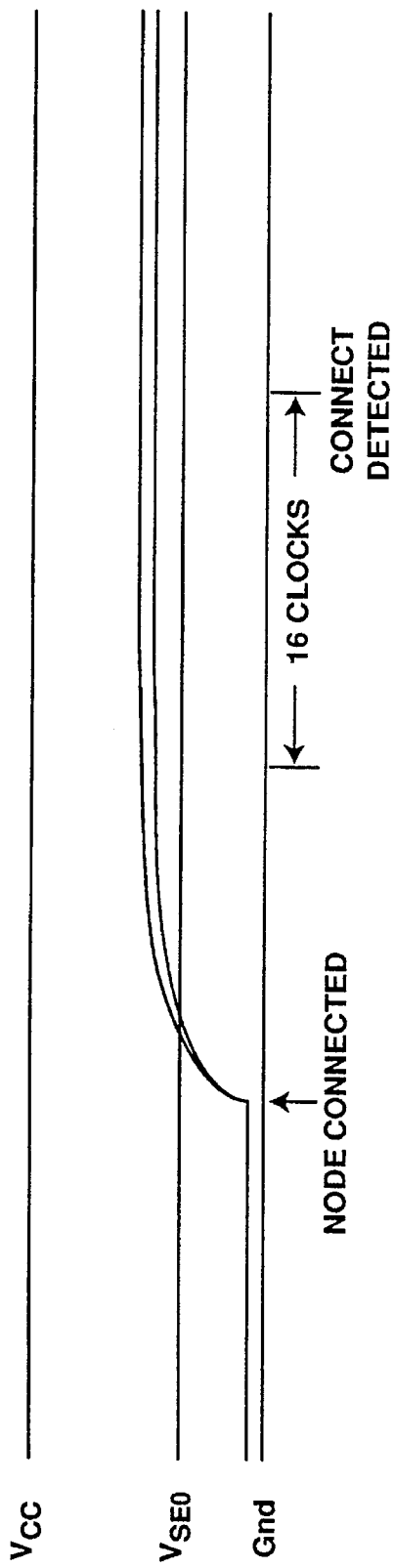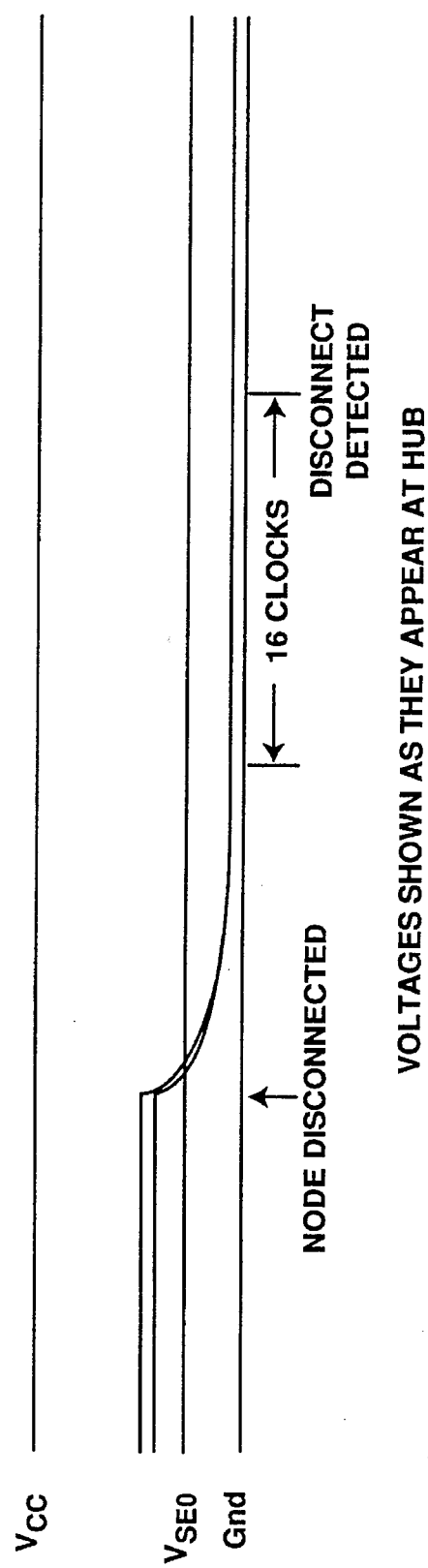
Figure 15

| DATA AND CONTROL STATES | ELECTRICAL REPRESENTATION |
|---|---|
| CONNECT | V+ and V− >Vse0 for 16 bit times |
| DISCONNECT | V+ and V− < Vse0 for 16 bit times |
| START OF PACKET | V+ and V− < Vse0 for 3 bit times |
| END OF PACKET | V+ and V− < Vse0 for 1 bit times |
| LOGICAL "1" | (V+) − (V−) > VDiff |
| LOGICAL "0" | (V+) − (V−) < VDiff |

*Figure 14*

METHOD AND APPARATUS FOR SERIAL BUS ELEMENTS OF AN HIERARCHICAL SERIAL BUS ASSEMBLY TO ELECTRICALLY REPRESENT DATA AND CONTROL STATES TO EACH OTHER

BACKGROUND OF THE INVENTION

1. Field of the Invention

The present invention relates to the field of computer systems. More specifically, the present invention relates to serial buses for connecting peripherals to the system units of computer systems, including the associated controllers and interfaces.

2. Background Information

A number of interrelated considerations is making it desirable to have a single, relatively fast, bi-directional, isochronous, low-cost, and dynamically configurable serial bus for simultaneously connecting isochronous as well as asynchronous peripherals to the system unit of a desktop computer system. Isochronous peripherals are peripherals that generate real time natural data such as voice, motion video, and the like. These interrelated considerations include:

Connection of the Telephone to the Desktop Computer

It is expected that the merging of computing and communication will be the basis of the next generation of productivity applications on desktop computers. The movement of machine oriented and human oriented data types from one location or environment to another depends on ubiquitous and cheap connectivity. Unfortunately, the computing and communication industries have evolved independently. As a result, a wide range of desktop computer and telephone interconnects have to be supported.

Ease of Use

The lack of flexibility in reconfiguring desktop computers has been acknowledged as its Achilles heel to it's further development. The combination of user friendly graphical interfaces and the hardware and software mechanisms associated with the new generation of system bus architectures have made desktop computers less confrontational and easier to reconfigure. However, from the enduser point of view, the desktop computer's I/O interfaces such as serial/parallel ports, keyboard/mouse/joystick interfaces, still lack the attributes of plug and play or too limiting in terms of the type of I/O devices that can be live attached/detached.

Port Expansion

The addition of external peripherals to desktop computers continues to be constrained by port availability. The lack of a bi-directional, low-cost, low to mid speed peripheral bus has held back the proliferation of peripherals like telephone/fax/modem adapters, answering machines, scanners, personal digital assistants (PDA), keyboards, mouses, etc. Existing interconnects are optimized for one or two point products. As each new function or capability is added to the desktop computer, typically a new interface has been defined to address this need.

In other words, this desired serial bus is expected to provide low cost simultaneous connectivity for the relatively low speed 10–100 kbps interactive devices such as keyboard, mouse, stylus, game peripherals, virtual reality peripherals, and monitors, as well as the moderate speed 500–5000 kbps isochronous devices such as ISDN, PBX, POTS, and other audio devices. A multiplicity of both types of devices are expected to be connected and active at the same time, and yet the latter type of devices are provided with guaranteed latencies and bandwidths. Furthermore, the devices are expected to be hot attached and detached, with the serial interface being able to dynamically reconfigure itself without interrupting operation of the desktop computer system.

There are several technologies that are commonly considered to be serial buses for connecting peripherals to system units of computer systems. Each of these buses is designed to handle a specific range of communications between system units and peripherals. Particular examples of these buses include:

Apple® Desktop Bus (ADB): ADB is a proprietary bus of Apple Computer Inc. It is a minimalist serial bus that provides a simple read/write protocol to up to 16 devices. Only basic functions are required of the controller and interface hardware. Thus, the implementation cost is expected to be low. However, ADB supports data rates only up to 90 kbps, just enough to communicate with asynchronous desktop devices such as keyboards and mouses. It is not capable of simultaneously supporting the moderate speed isochronous devices discussed earlier.

Access.bus (A.b): A.b is developed by the Access.bus Industry Group. It is based on the $I^2C$ technology of Philips Corporation and a software model of Digital Equipment Corporation (DEC). A.b is also designed primarily for asynchronous devices such as keyboards and mouses. However A.b is generally considered to be more versatile than ADB. A.b's protocol has well defined specifications for dynamic attach, arbitration, data packets, configuration and software interface. Moderate amount of functions are required of the controller and interface hardware. Thus, the implementation cost is only marginally competitive for the desired desktop application. While addressing is provided for up to 127 devices, the practical loading is limited by cable lengths and power distribution considerations. Revision 2.2 specifies the bus for 100 kbps operation, but the technology has headroom to go up to 400 kbps using the same separate clock and data wires. However, at 400 kbps, A.b still falls short in meeting the requirements of the moderate speed isochronous devices.

IEEE's P1394 Serial Bus Specification (aka FireWire): FireWire is a high performance serial bus. It is designed primarily for hard disk and video peripherals, which may require bus bandwidth in excess of 100 Mbps. It's protocol supports both isochronous and asynchronous transfers over the same set of 4 signal wires, broken up as differential pairs of clock and data signals. Thus, it is capable of simultaneously meeting the requirements of low speed interactive as well as moderate speed isochronous devices. However, elaborate functions are required of the controller and interface hardware, rendering FireWire to be non-price competitive for the desired desktop application. Moreover, the first generation of devices, based on FireWire's specification, are only just becoming available in the market.

The Concentration Highway Interface (CHI): CHI is developed by American Telephone & Telegraph Corporation (AT&T) for terminals and digital switches. It is a full duplex time division multiplexed serial interface for digitized voice transfer in a communication system. The protocol consists of a number of fixed time slots that can carry voice data and control information. The current specification supports data transfer rates up to 4,096 Mbps. The CHI bus has 4 signal wires: Clock, Framing, Receive Data, and Transmit Data. Both, the Framing and the Clock signals are generated centrally (i.e. PBX switch). Thus, it is also capable of simultaneously meeting the requirements of low speed interactive as well as the moderate speed isochronous devices. Similar to FireWire, elaborate functions are also required of the controller and interface hardware. As a result, CHI is also non-price competitive for the desired desktop application.

As will be disclosed in more detail below, the present invention provides the desired serial bus assembly, including its associated controller, bridging connectors and interfaces, that advantageously overcomes the limitations of the prior art serial buses in a novel manner.

SUMMARY OF THE INVENTION

The present invention includes circuitry and complementary logic provided to a bus controller, a number of 1:n bus signal distributors, and a number of bus interfaces of an hierarchical bus assembly for electrically representing data and control states each other. The hierarchical serial bus assembly is used to serially interface a number of isochronous and asynchronous peripherals to the system unit of a computer system. The serial bus elements are interconnected to each other using low cost two wire signal cable. Electrical signals are propagated between the serial bus elements in a differential manner. These circuitry and complementary logic of the serial bus elements jointly implement inference of data and control states from the states and/or durations of the propagating electrical signals.

These data and control states inferable from the electrical signals include a "connected" state, a "disconnected" state, a logic "0", and a logic "1". For some embodiments that support communication packet based transactions, the data control states inferable from the electrical signals further include a "start of packet" demarcation, and an "end of packet" demarcation.

Each serial bus element, i.e. the bus controller, the bus signal distributor, and the bus interface is provided with drivers for outputting the electrical signals at the various representative voltages, and/or for the various representative durations defining the various inferable data and control states. Each serial bus element is further provided with drivers for outputting the differential and the reference voltages. Lastly, each serial bus element is further provided with the encoding and decoding logic for controlling the operation of the drivers, and decoding the electrical signals received.

BRIEF DESCRIPTION OF DRAWINGS

The present invention will be described by way of exemplary embodiments, but not limitations, illustrated in the accompanying drawings in which like references denote similar elements, and in which:

FIGS. 10–11 illustrate one embodiment of the 1:n bus signal distributor of the present invention including its port circuitry;

FIGS. 12–13 illustrate one embodiment of the bus interface of the present invention including its connector circuitry;

FIG. 14 illustrates one embodiment of the data and control states of the present invention inferable from the electrical signals;

FIG. 15 illustrates electrical representations of the "connected" and the "disconnected" states under the present invention;

DETAILED DESCRIPTION

In the following description for purposes of explanation, specific numbers, materials and configurations are set forth in order to provide a thorough understanding of the present invention. However, it will be apparent to one skilled in the art that the present invention may be practiced without the specific details. In other instances, well known systems are shown in diagrammatic or block diagram form in order not to obscure the present invention.

Figure 1:
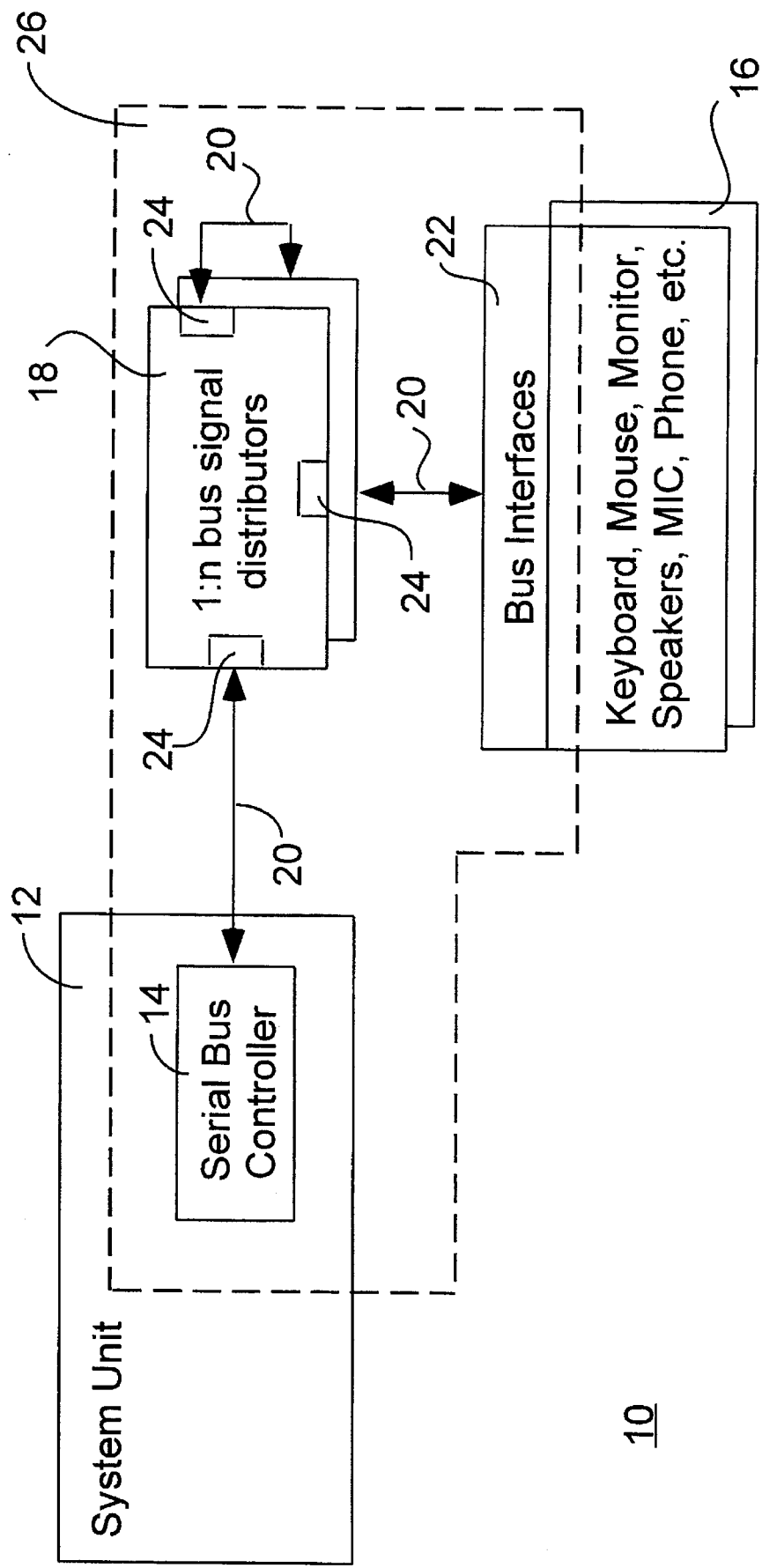
FIG. 1 illustrates an exemplary computer system incorporating the serial bus teachings of the present invention.

Hierarchical Serial Bus Assembly for Serially Interfacing Isochronous and Asynchronous Peripherals to a System Unit of a Computer System Referring now to FIG. 1, a block diagram illustrating an exemplary computer system incorporating the serial bus teachings of the present invention is shown. Exemplary computer system 10 comprises system unit 12 having serial bus controller 14 of the present invention, 1:n bus signal distributors 18 of the present invention, each having n+1 ports 24, and peripherals 16 having bus interfaces 22 of the present invention. Peripherals 16 are coupled to bus controller 14 of system unit 12 through 1:n bus signal distributors 18 and cables 20. Collectively, bus controller 14, bus signal distributors 18, bus interfaces 22, and cables 20 form a serial bus assembly 26 interconnecting bus agents, i.e. system unit 12 and peripherals 16 to each other.

Figure 7:
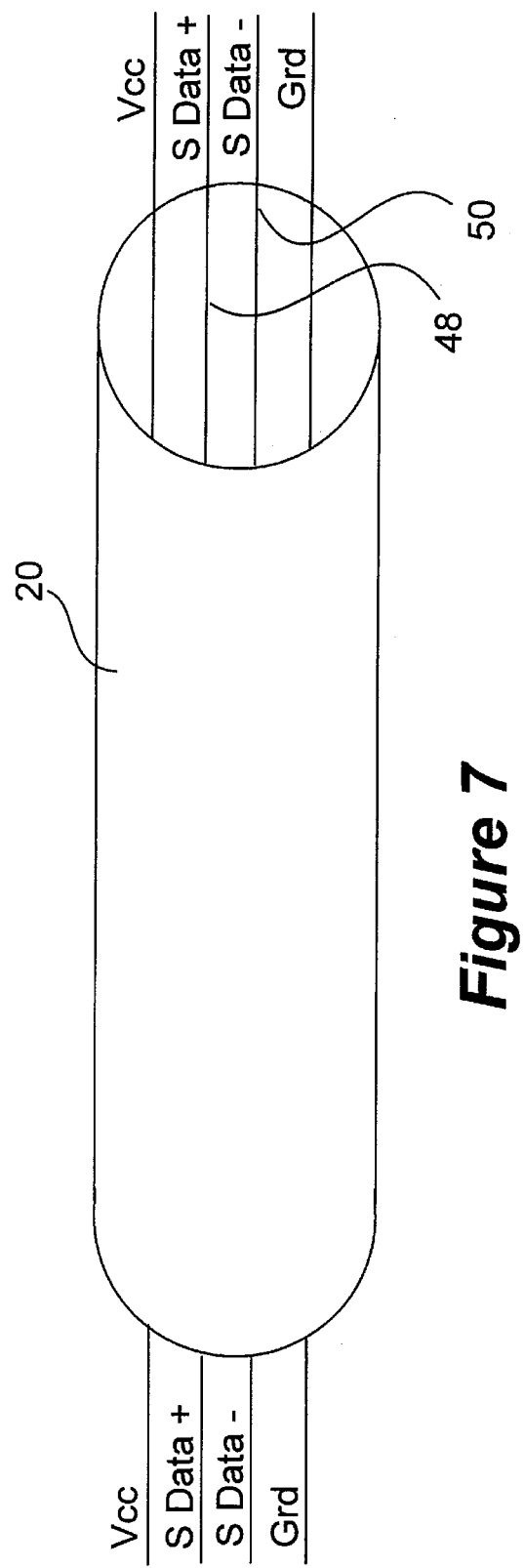
FIG. 7 illustrates one embodiment of the cables physically connecting the serial bus elements under the present invention.

Cables 20 are preferably low cost two signal wires cables 48 and 50 (as illustrated in FIG. 7). However, cable 20 are capable of supporting data transfer rates up to 5 Mbps. Furthermore, when such low cost cables 20 are employed, electrical signals are preferably propagated over the two signal wires 48 and 50 between the interconnected devices 14, 18 and 22 in a differential manner. For examples, a negative voltage differential represents a 1-bit and a positive voltage differential represents a 0-bit. Electrical signals are preferably also used to represent a number of control states. A particular implementation of electrically representing data and control states will be described in more detail below.

Except for bus controller 14, system unit 12 is intended to represent a broad category of system units of computer systems whose constitutions and functions are well known, and will not be otherwise further described. Similarly, except for bus interfaces 22, peripherals 16 are intended to represent a broad category of desktop peripherals, such as keyboards, mouses, monitors, speakers, microphone, telephones, whose constitutions and functions are also well known, and will not be otherwise further described either. Bus controller 14, bus signal distributors 18 and bus interfaces 22 will be described in more detail below with additional references to the remaining figures.

Figure 2:
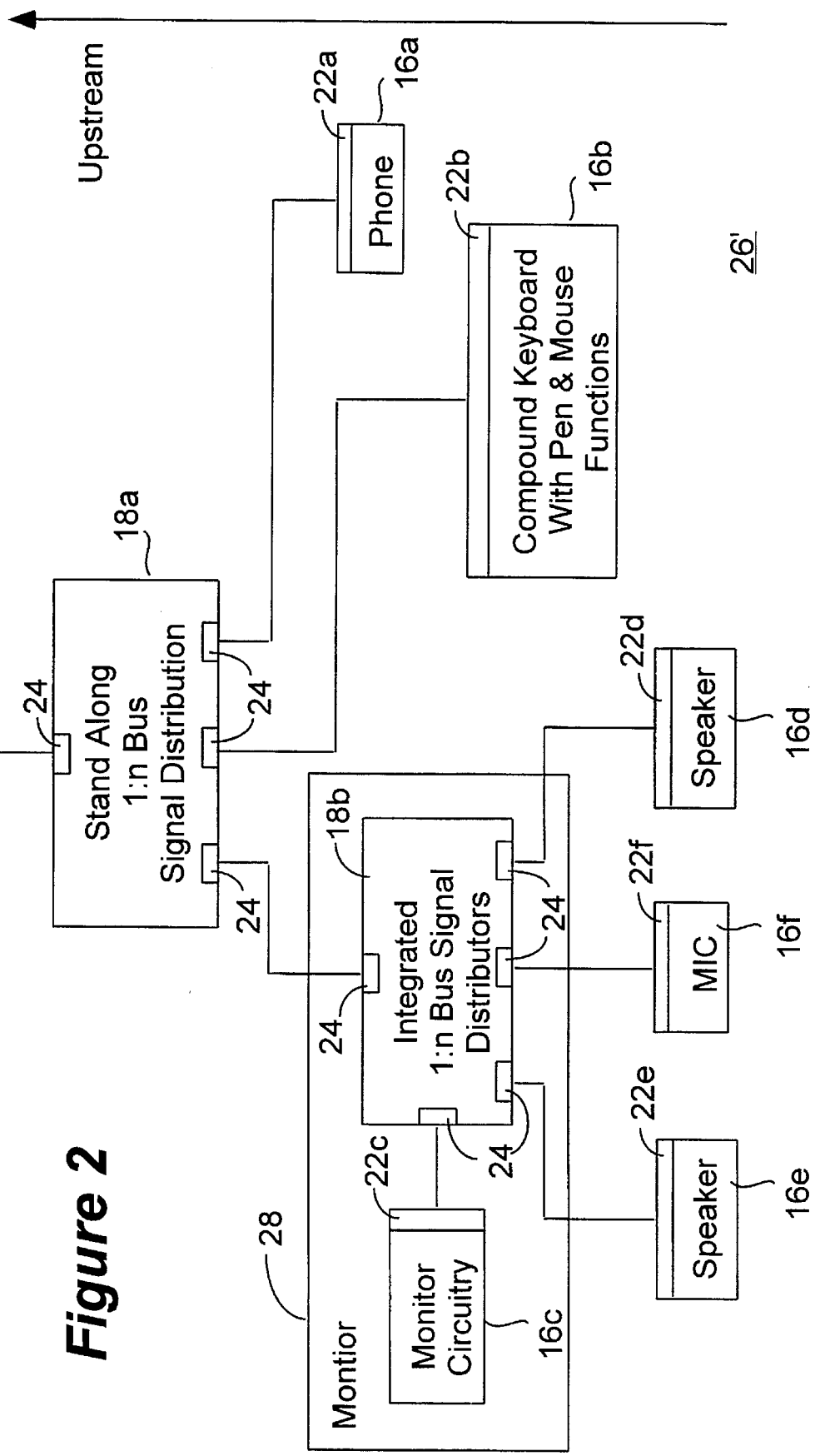
FIG. 2 illustrates one embodiment of the serial bus assembly of FIG. 1 in further detail.

FIG. 2 illustrates one embodiment of the serial bus assembly of FIG. 1 in further detail. For this embodiment, serial bus assembly 26' includes serial bus controller 14, standalone 1:n bus signal distributor 18a, integrated 1:n bus signal distributor 18b, and bus interfaces 22a–22f. The serial bus assembly 26' interconnects bus agents telephone 16a, compound keyboard 16b including keyboard, pen and mouse functions, monitor circuitry 16c of monitor 28, speakers 16d–16e and microphone 16f to system unit 12. Together, the system unit 12, the serial bus elements 14, 18a–18b and 22a–22f, and the interconnected peripherals 16a–16f form an hierarchy of interconnected devices.

Under the present invention, a bus interface 22a–22f is always a termination point. Only a bus signal distributor, e.g. 18a, may have one or more bus signal distributors, e.g. 18b, and/or one or more bus interfaces, e.g. 16a, coupled upstream to it. For the purpose of this disclosure, upstream means "towards the bus controller". Thus, except for the degenerate case where the serial bus assembly 26 has only one connecting peripheral 16, typically it is a bus signal distributor, such as 18a, that is connected upstream to the bus controller 14.

Furthermore, under the present invention, a connecting peripheral may be an isochronous peripheral, such as telephone 16a, speakers 16d–16e, and microphone 16f, or asynchronous peripherals, such as compound keyboard 16b and monitor 16c. The isochronous peripherals may operate with a data transfer rate as high as 5 Mbps, while the asynchronous peripherals may operate with a data transfer rate as high as 100 kbps. Furthermore, a connecting peripheral 16a–16f may be a multiple function peripheral, i.e. multiple functions mapping to a single bus connection point serviced by a bus interface, e.g. 22b. Similarly, although not shown, the system unit 12 may support multiple clients.

Figure 3:
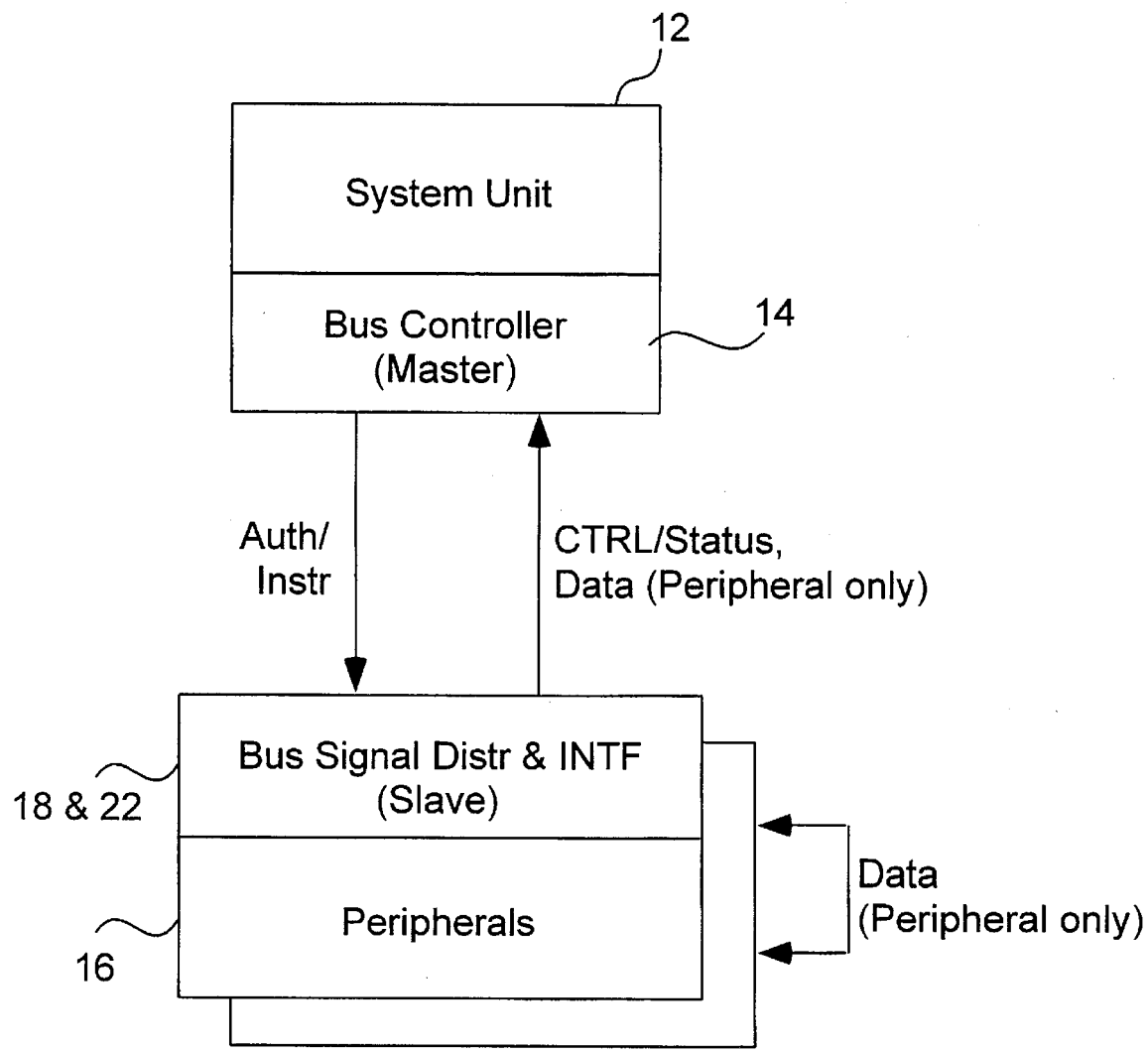
FIG. 3 illustrates a master/slave model of flow control employed by the present invention for serially interfacing the interconnected peripherals to the system unit and controlling transaction flows.

FIG. 3 illustrates a master/slave model of flow control employed by the present invention for serially interfacing the interconnected peripherals to the system unit and controlling transaction flow. As illustrated, the bus controller 14, the signal bus distributors 18, and the bus interfaces 22 cooperate to implement the master/slave model of flow control. The bus controller 14 serves as the master, and the signal bus distributors 18 as well as the bus interfaces 22 behave as slave devices to the bus controller 14.

Under the master/slave model, the bus controller 14 provides flow control for all data communication transactions between the bus agents at their respective operating speeds. The bus interfaces 22 engage in data communication transactions on behalf of the functions of the peripherals 16. However, the bus interfaces 22 accept or transmit data only if they have been authorized or instructed (aka "polled") to do so by the bus controller 14. The bus signal distributors 18 serve strictly as signal distributors. They are merely transparent conduits when data communication transactions are conducted by the bus controller 14 and the bus interfaces 22 on behalf of the bus agents. Thus, the bus signal distributors 18 never actively participate in data communication transactions, accept data or respond with data.

The bus controller 14 systematically polls the functions of the interconnected peripherals 16 through their bus interfaces 22 for data communication transactions in accordance to a polling schedule which guarantees latencies and bandwidths to the isochronous functions of the interconnected peripherals 16. Polling of the isochronous functions of the interconnected peripherals 16 for data communication transactions are prioritized over for all other polling and as frequent as they are necessary to meet the guaranty. Polling of the asynchronous functions of the interconnected peripherals 16 through their bus interfaces 22 for data communication transactions are scheduled around the polling of the isochronous functions of the interconnected peripherals 16 for data communication transactions. Preferably, the polling schedule is dynamically adapted to the interconnected peripherals 16 actually present.

In some embodiments, the bus controller 14, the bus signal distributors 18 and the bus interfaces 22 further engage in connection management transactions employing the same master/slave model for flow control. Similarly, the bus controller 14 provides flow control for conducting the connection management transactions at the serial bus elements' respective operating speeds. The bus signal distributors 18 and the bus interfaces 22 respond to the connection management transactions, replying with control/status information as appropriate. The bus controller 14, during operation, polls the bus signal distributors 18 and the bus interfaces 22 for such transactions. Polling of the bus signal distributors 18 and the bus interfaces 22 for connection management transactions are also scheduled around polling of the isochronous functions of the interconnected peripherals 16 for data communication transactions. Preferably, the expanded polling schedule is also dynamically adapted to the serial bus elements actually present.

Figure 4:
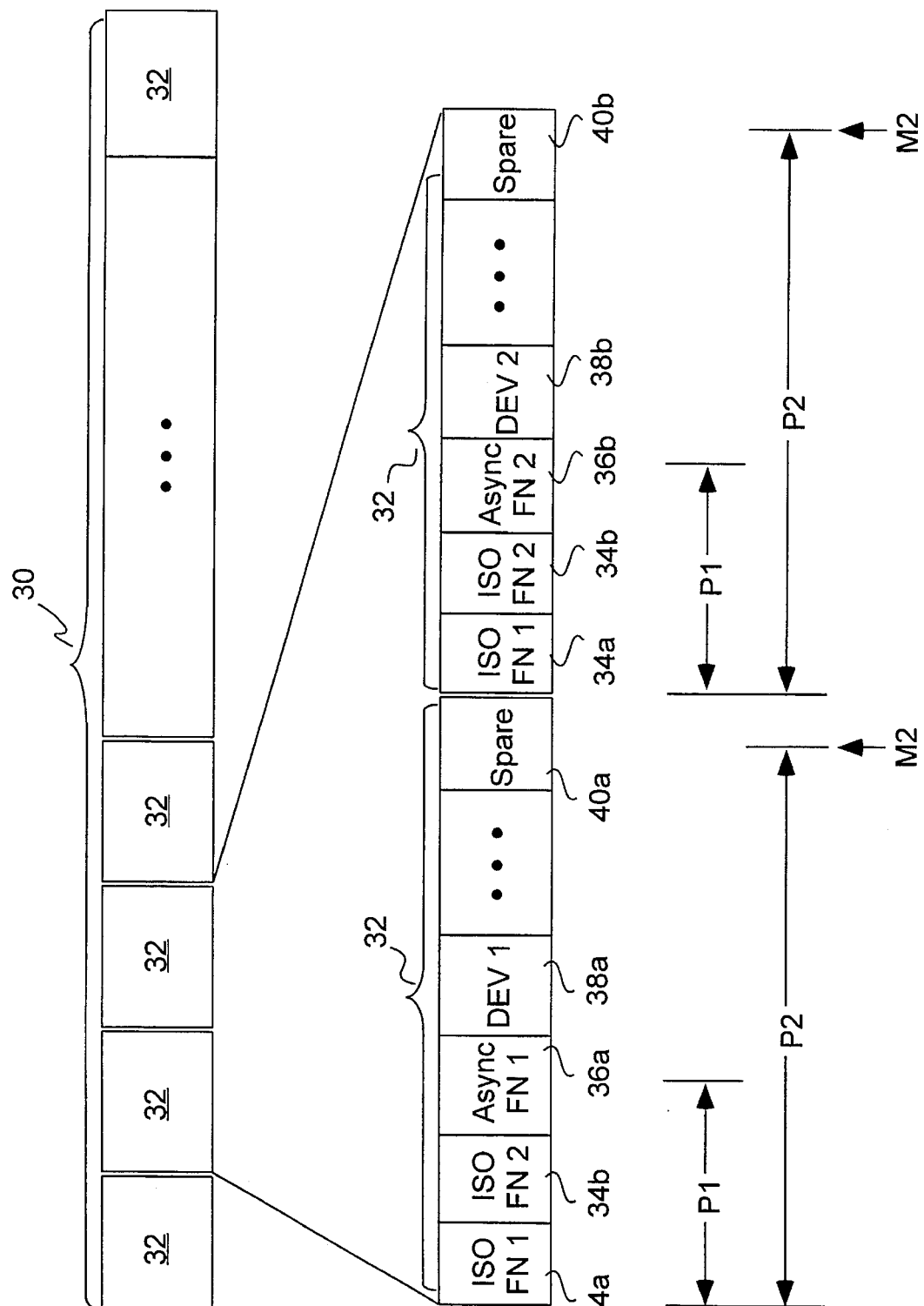
FIG. 4 illustrates a frame based polling schedule of the present invention implemented by some embodiments for polling the slave "devices"

FIG. 4 illustrate a frame based polling scheduling of the present invention implemented by some embodiments for conducting the various transactions employing the master/slave model of flow control. As illustrated, the polling schedule 30, also referred to a super frame, comprises of a number of sub-schedules 32, also referred to as soft frames. An isochronous function 34a or 34b of an interconnected peripheral 16 is polled as frequent as it is necessary in one or more soft frames 32 of the super frame 30 to guarantee its latency and bandwidth. However, an asynchronous function 36a or 36b is polled only once in one soft frame 32 of the super frame 30 for data communication transaction. Similarly, an interconnected device 38a or 38b is also polled only once in one soft frame 32 of the super frame 30 for connection management transaction.

Preferably, all isochronous functions 34a–34b are polled within a first percentage portion (P1) of a soft frame 32 to ensure the latency and bandwidth guaranties are met. Isochronous functions that cannot be accommodated within P1 are preferably rejected for insufficient capacity. The upper delimiter (M1) of P1 is also referred to as the isochronous watermark. Similarly, all polling are preferably performed within a second percentage portion (P2) of a soft frame 32 to ensure reliability of operation. Multiple soft frames 32 are employed if necessary to accommodate all asynchronous function and serial bus element polling. The upper delimiter (M2) of P2 is also referred to as the frame watermark.

Various manners in which such frame based polling schedule may be dynamically generated and updated, are described in the copending application, Ser. No. 08/331,727, entitled Method And Apparatus For Dynamically Generating And Maintaining Frame Based Polling Schedules That Guaranty Latencies And Bandwidths To Isochronous Functions, which is hereby fully incorporated by reference which is hereby fully incorporated by reference.

Figure 5:
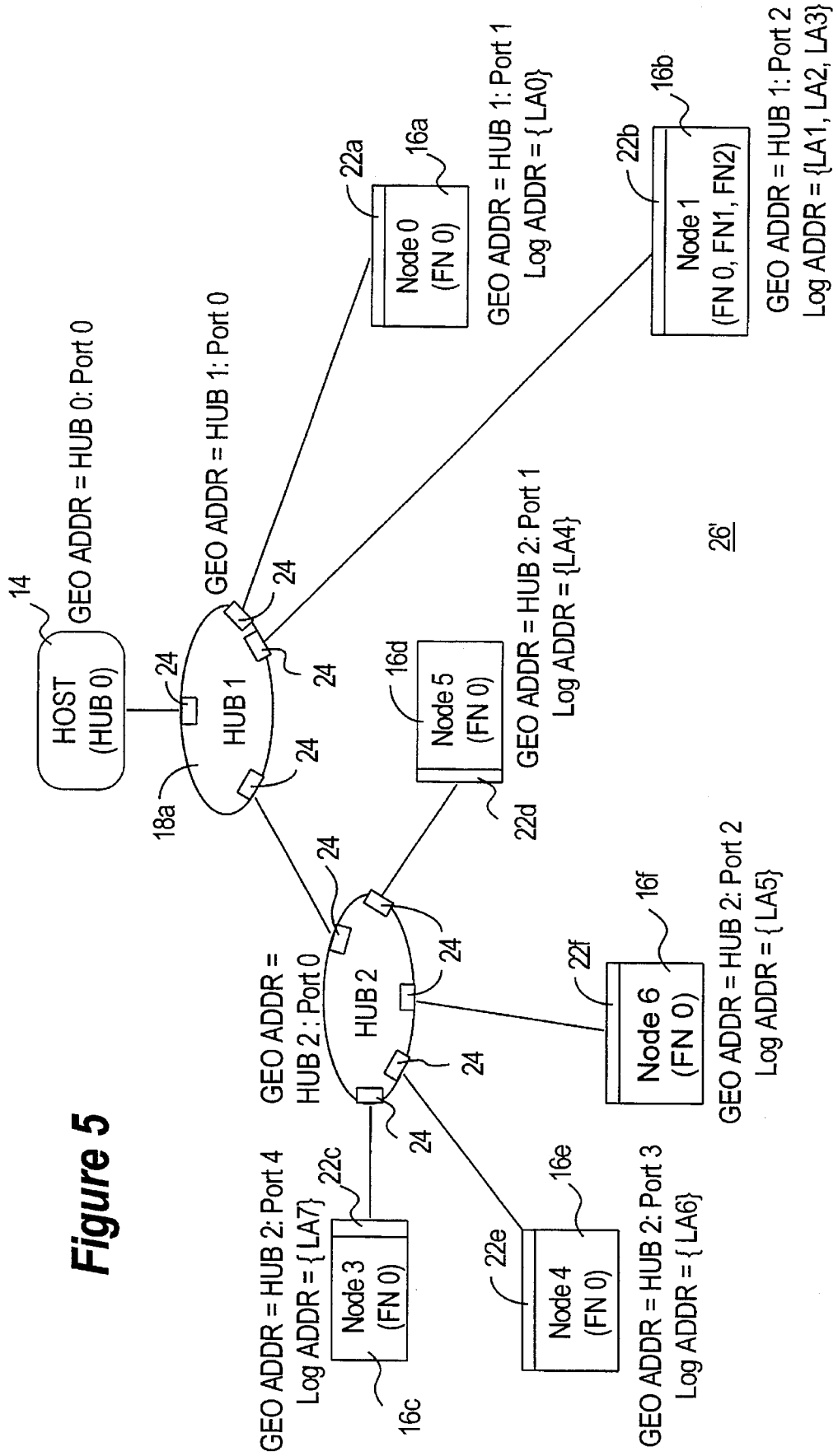
FIG. 5 illustrates geographical and logical addressing of the present invention implemented by some embodiments for addressing serial bus elements and functions of bus agents.

FIG. 5 illustrates geographical and logical addressing of the present invention implemented by some embodiments for addressing the serial bus elements and functions of bus agents. For ease of explanation, the same exemplary serial bus assembly of FIG. 2 is used. However, the bus controller 14 is labeled as Host, also referred to as Hub0. The bus signal distributors 18a–18b are labeled as Hub1 and Hub2. The peripherals 16a–16f including their corresponding bus interfaces 22a–22f are jointly labeled as Node0 through Node6. The functions of peripherals 16a–16f are labeled as FN0, FN1, etc.

As illustrated, the serial bus elements and functions of the bus agents are assigned geographical as well as logical addresses (GEO ADDR & LOG ADDR) of a geographical and a logical address space. More specifically, the Hubs 14, 18a–18b and the Nodes 22a–22f are assigned GEO ADDRes, whereas the functions of the Nodes 16a–16f are assigned LOG ADDRes. Preferably, the Hub identity as well as the upstream port of the Hub may be inferred from the GEO ADDR of a Hub 14, and 18a–18b, and the connecting Hub as well as the connecting port of the connecting Hub may be inferred from the GEO ADDR of a Node 22a–22f. In one embodiment, the LOG ADDRes are assigned to the functions of the Nodes 16a–16f in a chronological manner.

For examples, in the illustrated exemplary application, Hub1 and Hub2 18a and 18b are assigned the GEO ADDRes of "Hub1:Port0" and "Hub2:Port0" respectively, identifying the Hubs 18a and 18b as "Hub1" and "Hub2" respectively, and in each case, the upstream port being "Port0". Node1 and Node4 22b and 22e are assigned the GEO ADDRes of "Hub1:Port2" and "Hub2:Port3" respectively, identifying the connecting Hubs 18a and 18b as "Hub1" and "Hub2" respectively, and the connecting ports of connecting Hubs 18a and 18b as "Port2" and "Port3" respectively. The functions of Node1 16b are assigned the LOG ADDRes of "LA1", "LA2" and "LA3", whereas the function of Node4 16e is assigned the LOG ADDR of "LA6".

Preferably, the GEO ADDRes and the LOG ADDRes are dynamically assigned at power on or reset, and updated in response to live detachment of interconnected devices or attachment of additional devices, by the bus controller 14 in cooperation with the bus signal distributors 18 and the bus interfaces 22. A particular implementation of such dynamic connection management is described in the copending application, Ser. No. 08/332,375, entitled Method And Apparatus For Dynamically Determining And Managing Connection Topology Of An Hierarchical Serial Bus Assembly, which is hereby fully incorporated by reference.

For these embodiments, the GEO ADDRes are used to conduct connection management transactions among the serial bus element, whereas the LOG ADDRes are used to conduct data communication transactions among the functions of the bus agents The separation of the two types of transactions into the two separate address spaces facilitate dynamic connection management of the serial bus elements, without having to interrupt services to the functions of the bus agents.

Figure 6:
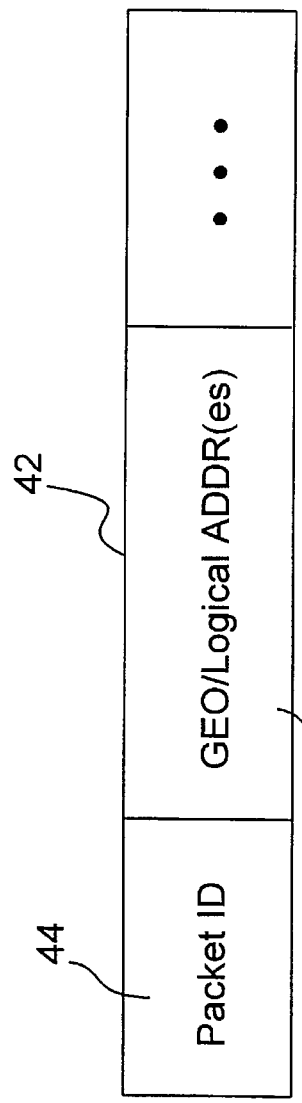
FIG. 6 illustrates the essential elements of communication packets of the present invention implemented by some embodiments for conducting transactions employing the master/slave model of flow control.

FIG. 6 illustrates the essential elements of communication packets of the present invention implemented by some embodiments for conducting the various transactions employing the master/slave model of flow control. For these embodiments, packet identifiers 44 are employed to differentiate control packets from data packets. Control packets are packets employed by the bus controller 14 to authorize or instruct the bus signal distributors 18 and the bus interfaces 22 to engage in transactions. Control packets may also include packets employed by the bus signal distributors 18 and the bus interfaces 22 to acknowledge authorizations or instructions from the bus controller 14. Furthermore, addresses 46 are employed as appropriate to identify the transaction parties. As will be appreciated that under the master/slave model of flow control, the bus controller 14 as a transaction participant may often be inferred, and therefore its address may be omitted.

Preferably, transaction flow, such as from bus controller 14 to a function, from a first function to a second function, may be inferred from the packet identifiers 44. Preferably, either geographical or logical addresses 46, i.e. "HubX:PortY" or "LAz", may be specified to accommodate those embodiments that support connection management transactions and implement both types of addresses.

A particular implementation of employing such communication packets to conduct the various transactions is described in the copending application, Ser. No. 08/332,573, entitled Method And Apparatus For Exchanging Data, Status And Commands Over An Hierarchical Serial Bus Assembly Using Communication Packets, which is hereby fully incorporated by reference.

Figure 8:
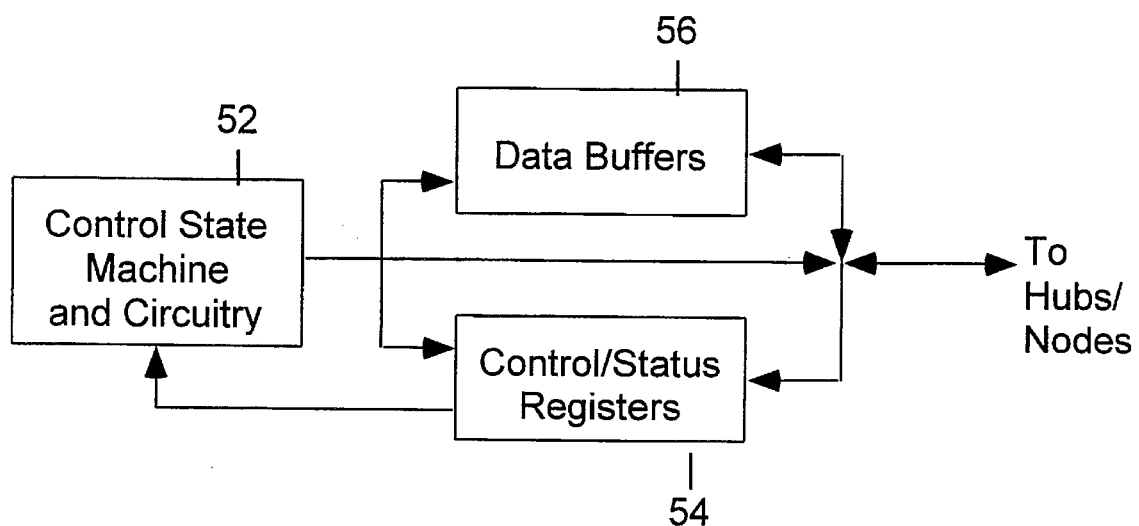
FIGS. 8–9 illustrate one embodiment of the bus controller of the present invention including its associated software.
Figure 9:
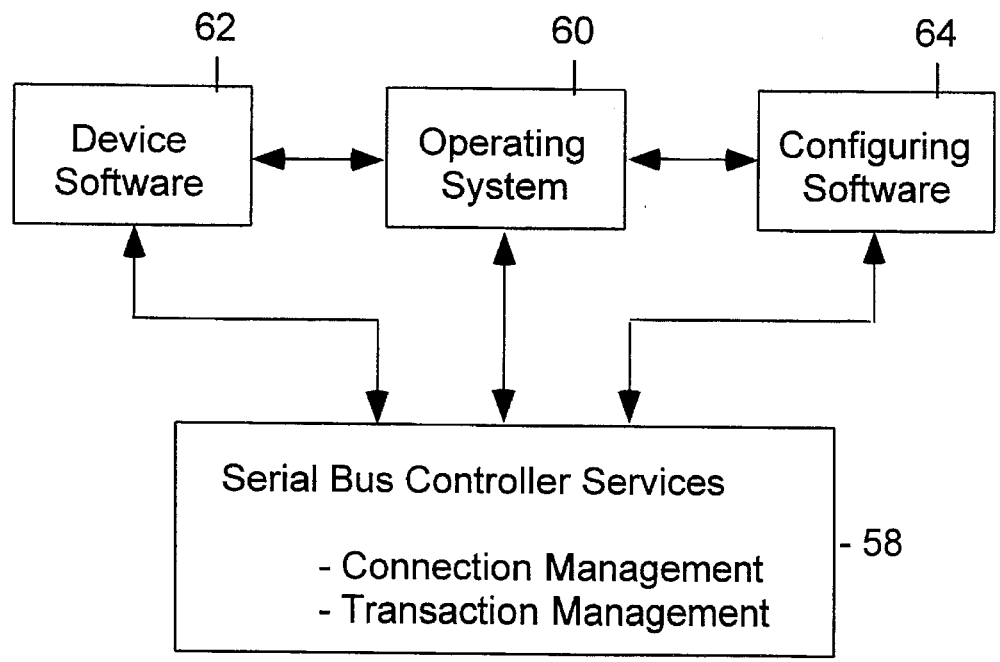

FIGS. 8–9 illustrate one embodiment of the bus controller of the present invention. In this embodiment, the bus controller 14 includes a control state machine and circuitry 52, control/status registers 54, data buffers 56, and bus controller software services 58. The control/status registers 54 are used to store the various control and status data. For examples, the serial bus elements present, their interconnection topology, the functions of the various interconnected peripherals, the geographical addresses assigned to the serial bus elements, the logical addresses assigned to the functions of the interconnected peripherals. The data buffers 56 are used to buffer the data of the data communication transactions between the bus agents. The control state machine and circuitry 52 operates the hardware, controlling data communication transactions and employing the above described master/slave model of flow control, under the programming of the bus controller software services 58. For some embodiments, the control state machine and circuitry 52 further operates the hardware, controlling connection management transactions, implementing the master/slave model of flow control with frame based polling schedule, employing geographical and logical addressing, supporting communication packet based transactions, and/or inference of data and control states from states of the propagation electrical signals. In particular, the control and state machine circuitry 52 causes the bus controller 14 to cooperate with the bus signal distributors 18 and the bus interfaces 22, and perform the electrical representation of data and control states of the present invention, which will be described in more below.

The bus controller software services 58 program the control state machine and circuitry 52 responsive to the operating system 60 and other software such as device and configuring software 62 and 64 of the system unit 12. In particular, the services include connection management such as detection of serial bus elements present, detection of their interconnection topology, detection of the functions of the interconnected peripherals, and assignment of the geographical and logical addresses. The services further include transaction management such as generation and maintenance of the polling schedule, polling of the serial bus elements and functions of the bus agents, acknowledgment of certain responses of the serial bus elements and functions of the bus agents, and exchange of data with functions of the bus agents.

For a more detailed descriptions of the bus controller hardware and the bus controller software services 58, refer to the incorporated by reference copending applications, Ser. Nos. 08/332,375, 08/331,727 and 08/332,573. It should be noted that the allocation of functions to the hardware and software services of the bus controller 14 is implementation dependent. The present invention may be practiced with any number of allocations, ranging from minimal hardware usage to minimal employment of software services.

Figure 10:
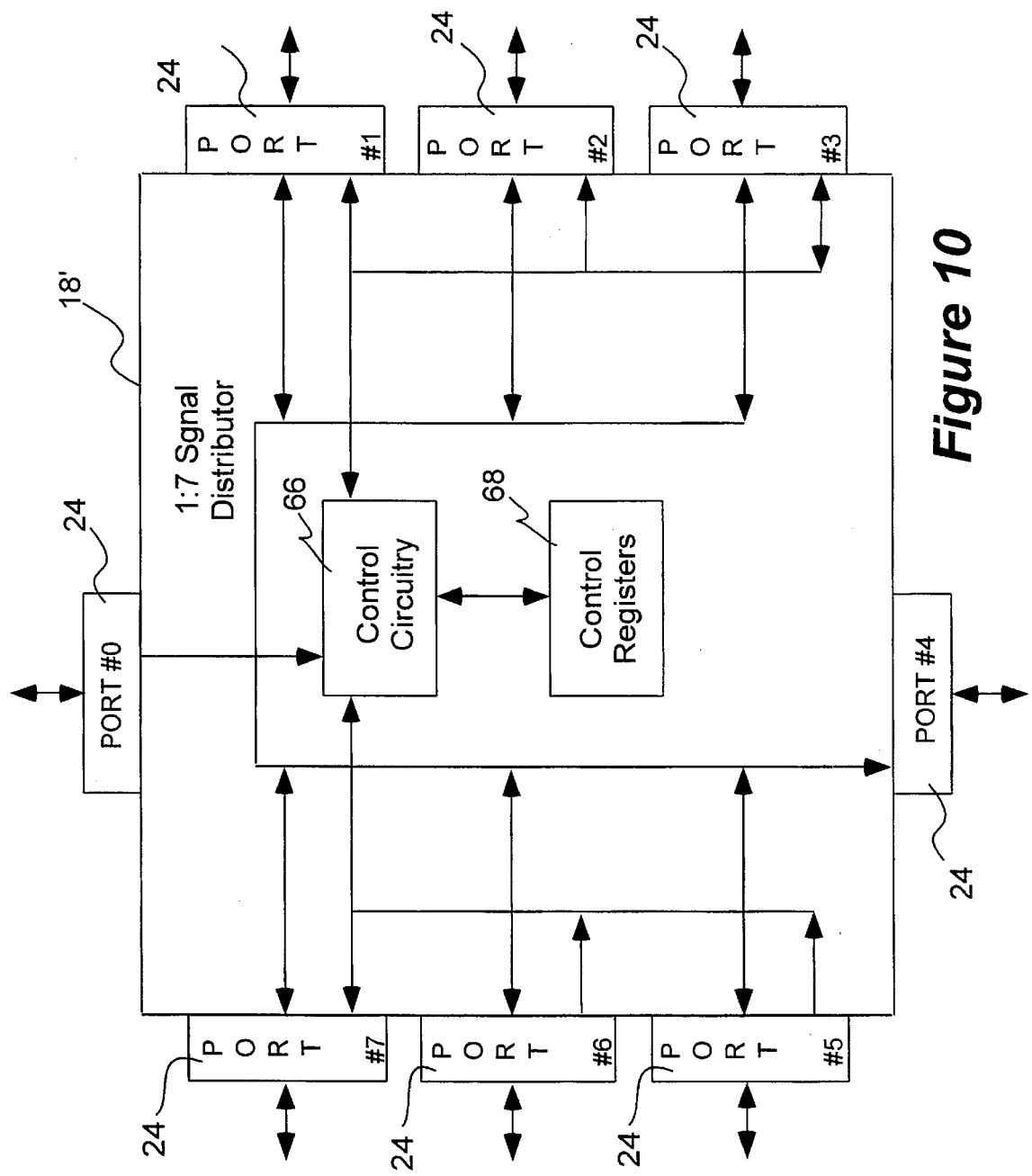

FIGS. 10–11 illustrate one embodiment of the bus signal distributor of the present invention. The illustrated embodiment is a 1:7 bus signal distributor 18' having control circuitry 66, control registers 68, and 8 ports 24. Port 0 24 is used to connect the bus signal distributor 18' upstream to the bus controller 14 or another bus signal distributor 18. Ports 1–7 are used to connect up to a total of 7 bus signal distributors 18 and/or bus interfaces 22 to itself. The control registers 68 are used to store its own control and status information such as whether a port 24 has a bus interface 22 connected to it or not, and whether the port 24 is turned ON/OFF. The control circuitry 66 operates the bus signal distributor 18' responsive to instructions from the bus controller 14. In particular, the control circuitry 66 causes the bus signal distributor 18 to cooperate with the bus controller 14, and the bus interface 22 to implement inference of data and control states from states and durations of the propagating electrical signals.

In embodiments where the low cost two signal wire cables 20 are used to interconnect the serial bus elements, and electrical signals are preferably propagated in a differential manner, each port 24 comprises two differential amplifiers 70 and 72 for generating the differential signals. Preferably, each port 24 further having two resistors 74 coupled to ground as shown, pulling the signals on the two wires to ground, thereby allowing the absence or presence of a connected bus interface 22 to be discernible. The appropriate values of resistors 74 may be determined empirically depending on individual implementations.

For a more detailed descriptions of the control circuitry 64 and its cooperative relationship with the bus controller 14, refer to the incorporated by reference copending application, Ser. No. 08/332,375.

Figure 12:
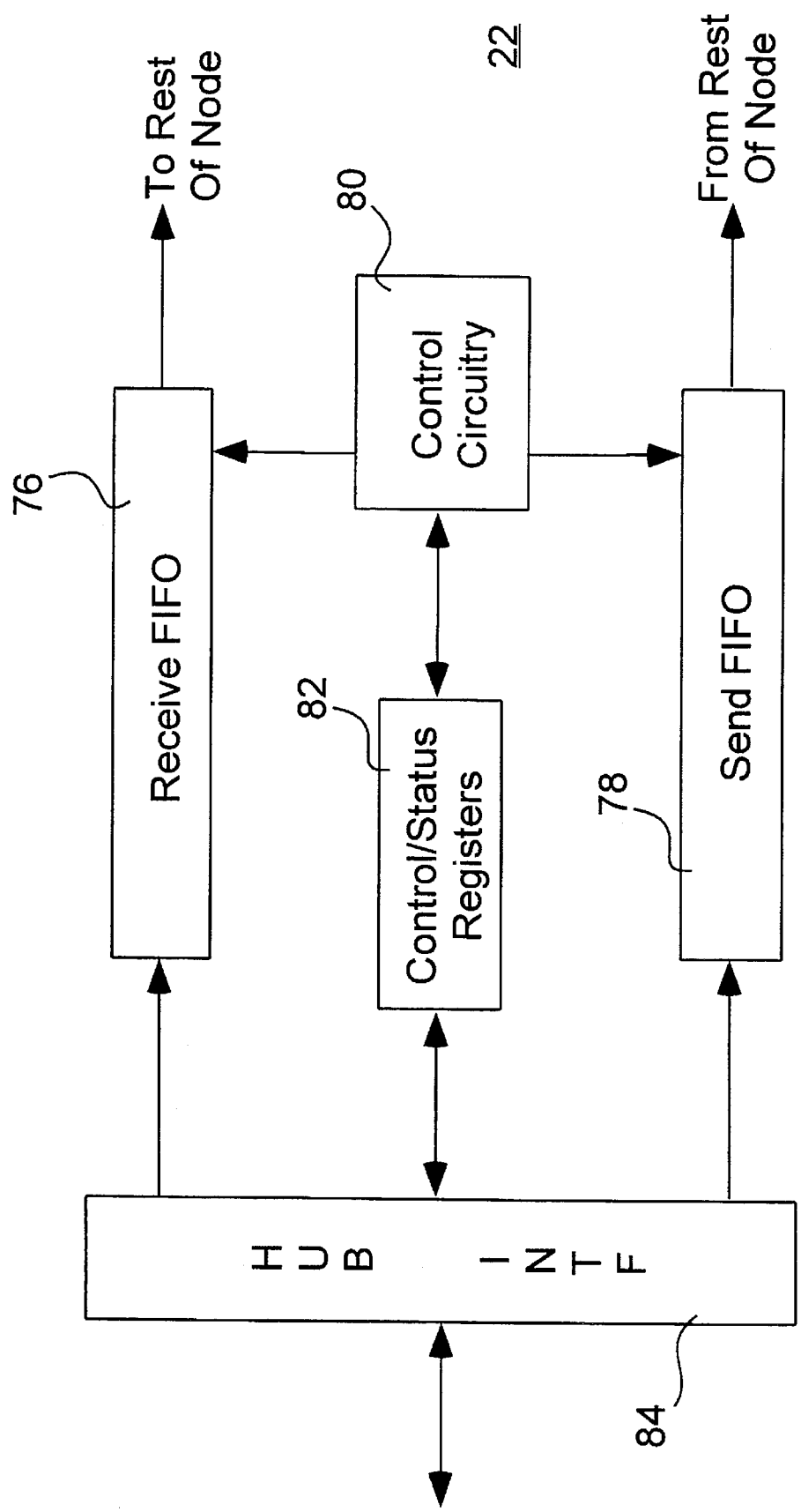

FIGS. 12–13 illustrate one embodiment of the bus interfaces of the present invention. For this embodiment, the bus interface 22 comprises control circuitry 80, control/status registers 82, a connector interface 84 and two FIFOs 76–78, a Receive FIFO 76 and a Send FIFO 78. Receive and Send FIFOs 76–78 are used to stage the receive and send data for data communication transactions. The control/status registers 68 are used to store its own control and status information such as its assigned geographical address, functions of its "host" peripheral, and their assigned logical addresses. The control circuitry 66 operates the bus interface 22 on behalf of the "host" peripheral and the "host" peripheral's functions, responsive to authorizations and instructions from the bus controller 14. In particular, the control circuitry 80 causes the bus interface 22 to cooperate with the bus controller 14, and the bus interface 22 to implement inference of data and control states from states of the propagation electrical signals.

In embodiments where the low cost two signal wire cables 20 are used to interconnect the serial bus elements, and electrical signals are preferably propagated in a differential manner, the connector interface 84 comprises two differential amplifiers 86 and 88 for generating the differential signals. Preferably, the connector interface 84 further includes two resistors 90 coupled to Vcc as shown, pulling the signals on the two wires to Vcc complementary to the port circuitry of a connecting bus signal distributor 18. The appropriate values of resistors 90 may also be determined empirically depending on individual implementations.

For a more detailed description of the bus interface 22, refer to the incorporated by reference copending applications, Ser. Nos. 08/332,375, 08/331,727 and 08/332,573.

Electrically Representing Data And Control States

Having now described the hierarchical serial bus assembly 26 and the manner its element cooperate to serially interface the isochronous and asynchronous peripherals 16 to the system unit 12 of the exemplary computer system 10, the present invention of electrically representing data and control states by the serial bus elements to each other will now be described.

Figure 16:
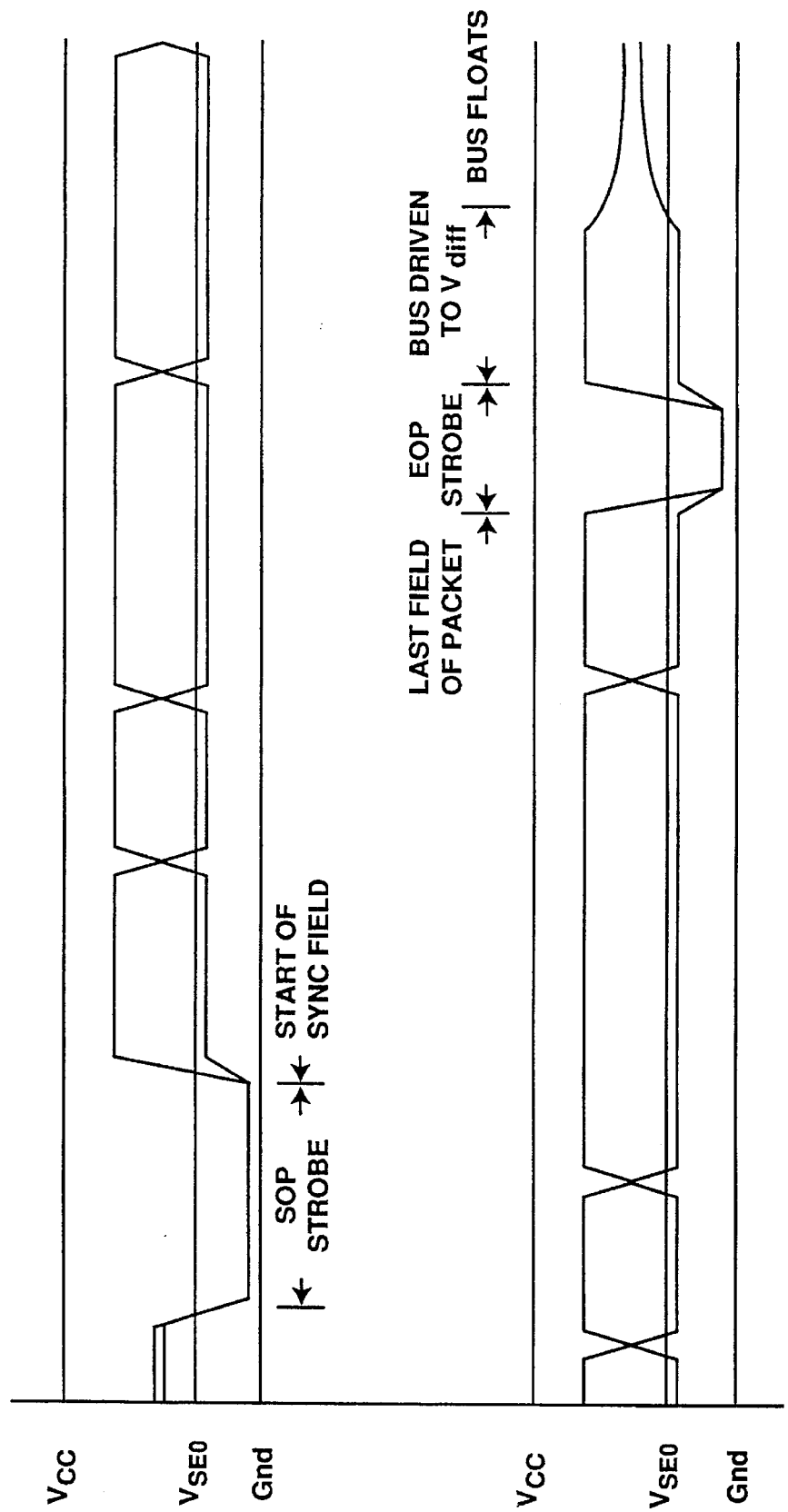
FIG. 16 illustrates electrical representations of the "start of packet" and "end of packet" demarcations under the present invention.

FIG. 14 illustrates one embodiment of the data and control states of the present invention inferable from the electrical signals. FIGS. 15 and 16 illustrate electrical representations of the "connected" and the "disconnected" states, and the "start of packet" and "end of packet" demarcations under the present invention respectively.

As shown, the data and control states 700 inferable from the propagating electrical signals include logical "1" and logical "0" 702 and 704 described earlier. Logic "1" 702 is electrically represented by a positive voltage difference greater than a predetermined positive voltage threshold, and Logic "0" 704 is electrically represented by a negative voltage difference greater than a predetermined negative voltage threshold. Furthermore, the data and control states include a "connected" state and a "disconnected" state 706 and 708. The "connected" state 706 is represented by having the voltages of both electrical signals simultaneously greater than a predetermined single ended voltage ($V_{se0}$) for a predetermined duration, e.g. a time period of 16 bits (or clocks) in length, and the "disconnected" state 708 is represented by having the voltages of both electrical signals simultaneously lower than a predetermined single ended voltage ($V_{se0}$) for a predetermined duration, e.g. a time period of 16 bits (or clocks) in length, as illustrated in FIG. 15.

For some embodiments supporting communication packet based transactions, the data and control states 700 further include a "start of packet" demarcation 710 and an "end of packet" demarcation 712. The "start of packet" demarcation 710 is represented by having the voltages of both electrical signals simultaneously lower than a predetermined single ended voltage ($V_{se0}$) for a predetermined duration, e.g. a time period of 3 bits (or clocks) in length, and the "end of packet" demarcation 712 is represented by having the voltages of both electrical signals simultaneously lower than a predetermined single ended voltage ($V_{se0}$) for a predetermined duration, e.g. a time period of 1 bit (or 1 clock) in length, as illustrated in FIG. 16.

Figure 18:
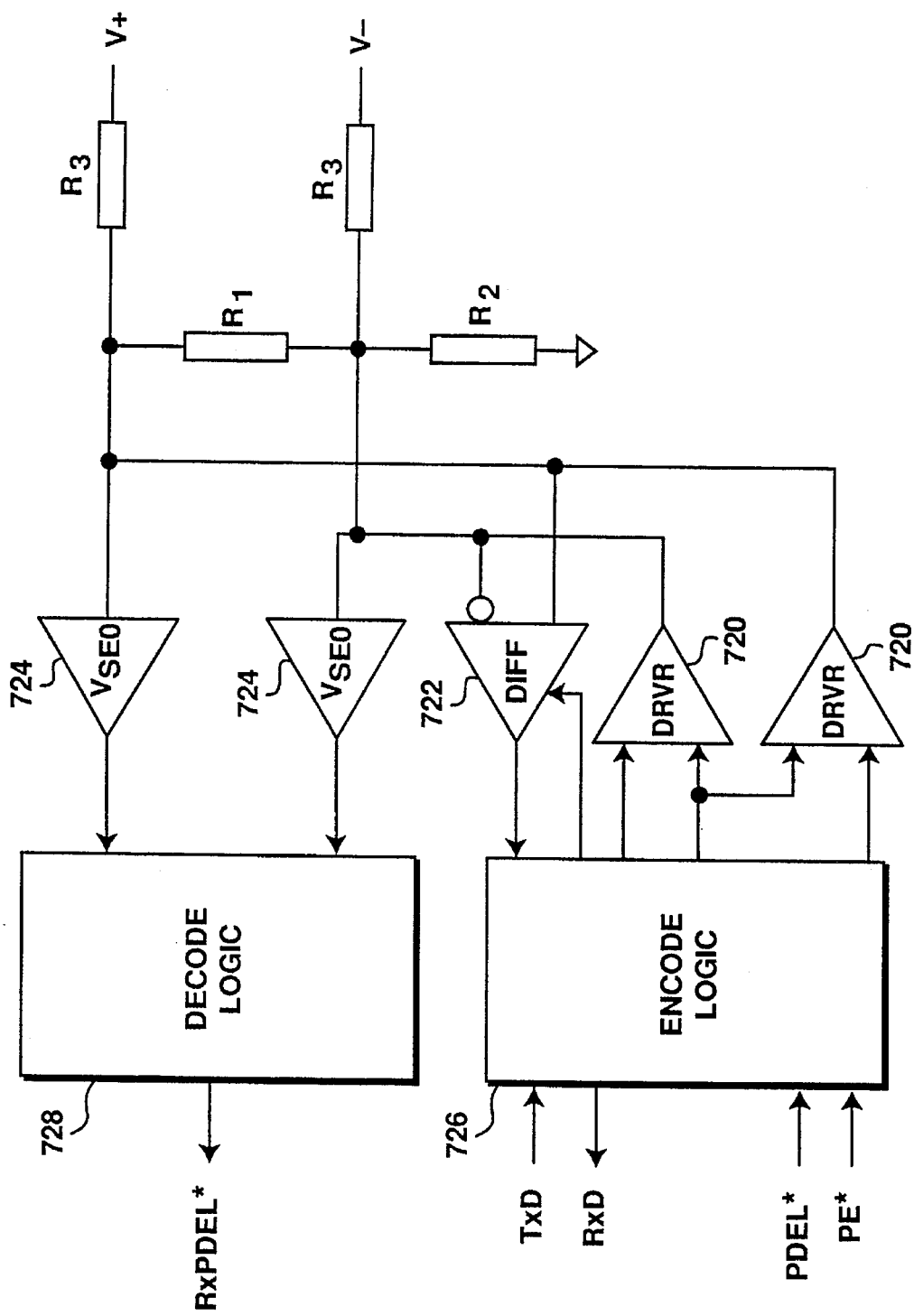
FIG. 18 illustrates one embodiment of the port circuitry provided to the bus signal distributor for implementing electrical representations of the present invention.
Figure 19:
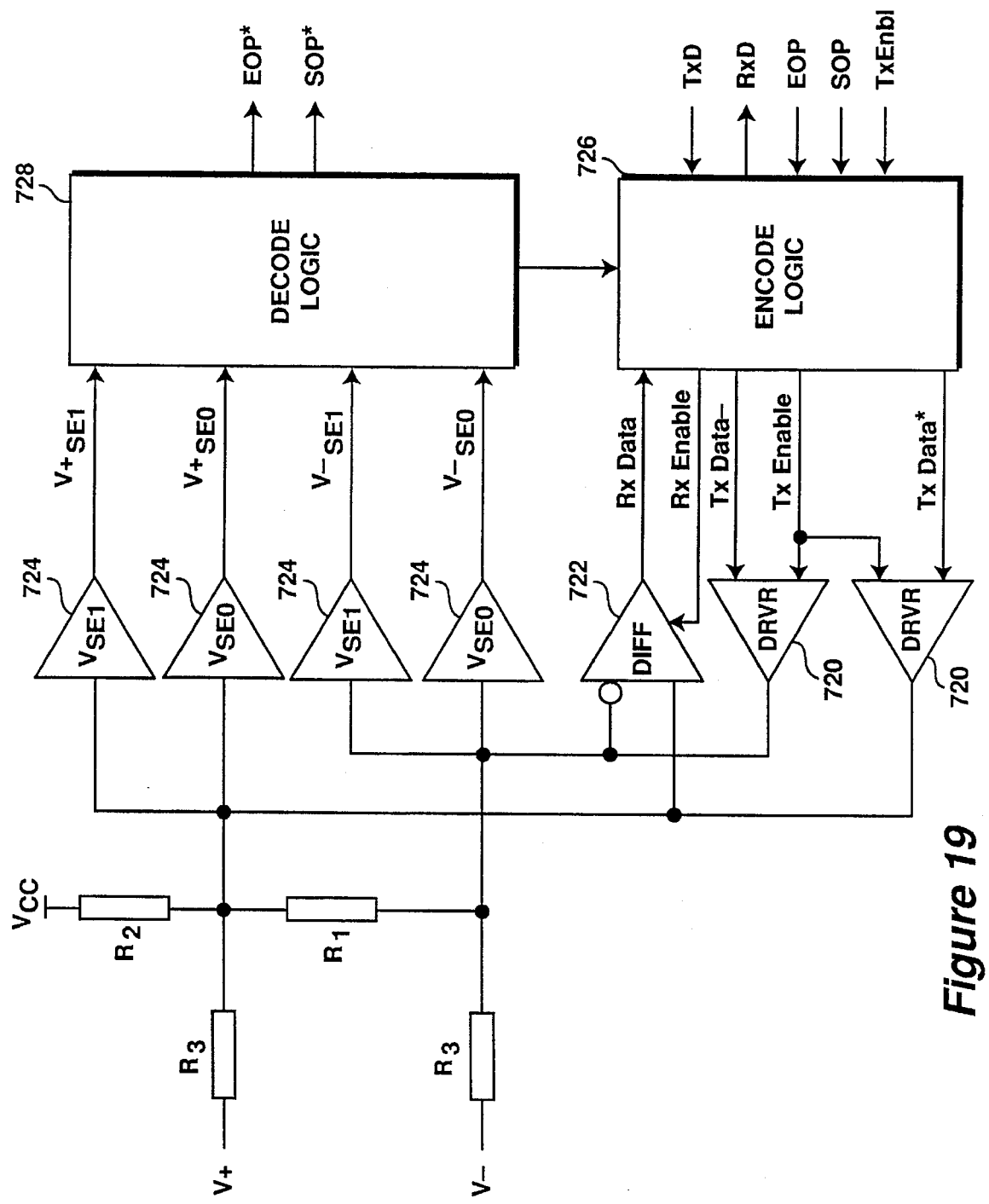
FIG. 19 illustrates one embodiment of the connecting circuitry provided to the bus interface for implementing electrical representations of the present invention.
Figure 17:
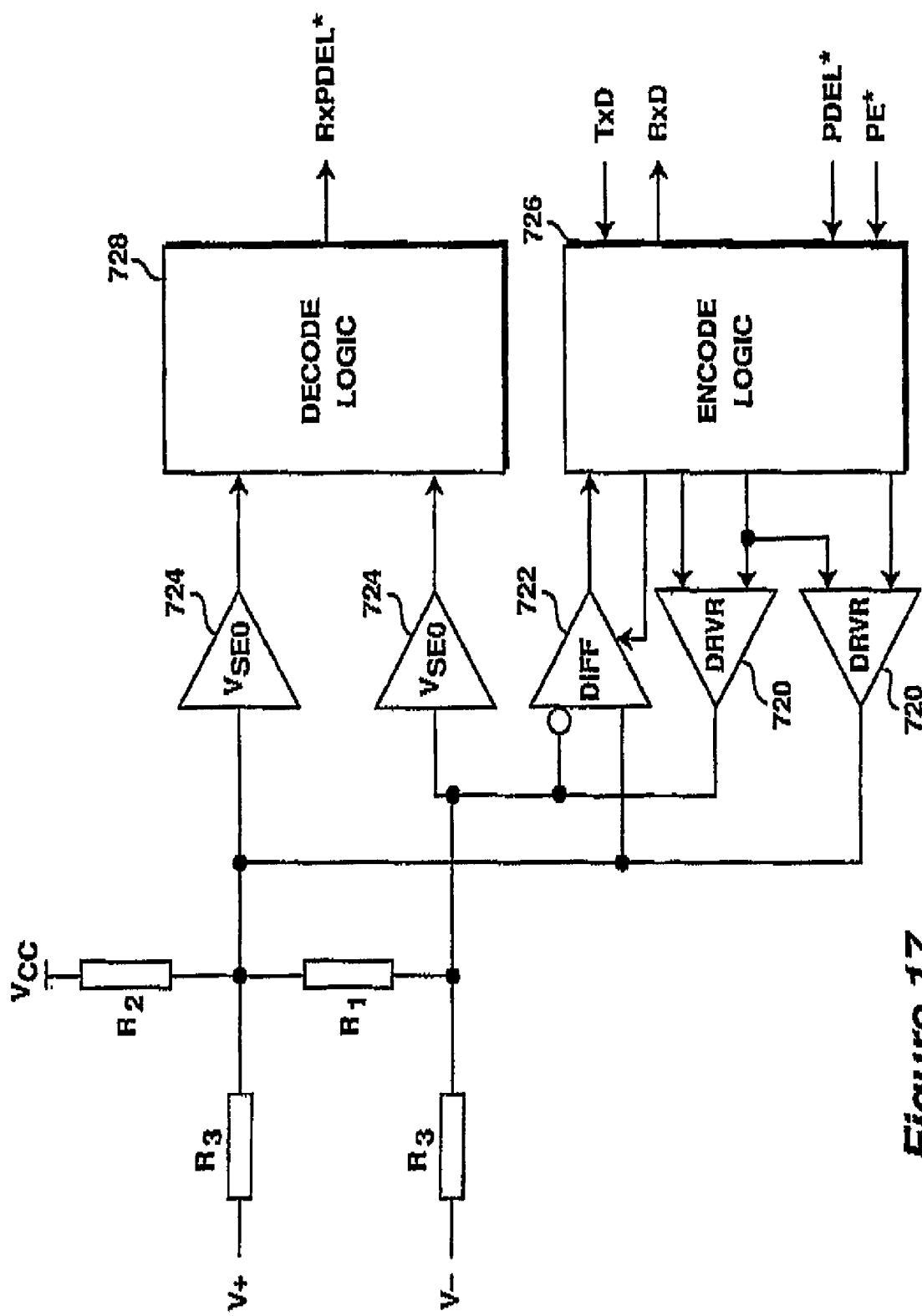
FIG. 17 illustrates one embodiment of the connecting circuitry provided to the bus controller for implementing electrical representations of the present invention.

FIGS. 17, 18 and 19 illustrate one embodiment each of the connecting circuitry provided to the bus controller, the bus signal distributor, and the bus interface for implementing electrical representations of the present invention respectively. The connection or port circuitry of each serial bus element, i.e. the bus controller 14, the bus signal distributor 18, and the bus interface 22 is provided with drivers 720 for outputting the electrical signals (V+ & V−) at the various representative voltages, and/or for the various representative durations defining the various inferable data and control states. Each serial bus element is further provided with drivers 722 and 724 for outputting the differential voltages. Lastly, each serial bus element is further provided with encoding and decoding logic 726 and 728 for controlling the operation of the drivers 720 and 722, and decoding the differential signals received.

Thus, a method and apparatus for serial bus elements to electrically represent data and control states to each other has been described. For a more detailed discussion of the circuitry and complementary logic provided to the bus controller 14, the bus signal distributor 18, and the bus interface 22 for implementing electrical representation of data and control states, refer to the enclosed Appendices.

While the present invention has been described in terms of the above embodiments, those skilled in the art will recognize that the invention is not limited to the embodiments described. In particular, beside the low cost two wires cable embodiments, the present invention may also be distributively practiced over cables with two or more pairs of wires. The method and apparatus of the present invention can be practiced with modification and alteration within the spirit and scope of the appended claims. The description is thus to be regarded as illustrative instead of limiting on the present invention.

What is claimed is:

1. An apparatus for incorporation into a first and a second serial bus element of a serial bus assembly having a plurality of serial bus elements, to allow the two serial bus elements to electrically represent data and control states to each other, said apparatus comprising:

first driver means for incorporation into the first serial bus element for driving a first pair of electrical signals in selected ones of voltage states for selected ones of time durations in a differential manner over a first pair of signal wires disposed in a first cable interconnecting the first and second serial bus elements;

encoding means for incorporation into the first serial bus element and coupled to the first driver means for controlling the first driver means thereby encoding data and control states in the first pair of electrical signals;

second driver means for incorporation into the second serial bus elements for receiving the first pair of electrical signals, and in response, outputting difference signals; and decoding means for incorporation into the second serial bus elements and coupled to the second driver means for receiving and decoding the difference signals.

2. The apparatus as set forth in claim 1, wherein said encoding means encodes a logical one by causing said first driver means to drive the first pair of electrical signals with a positive difference greater than a predetermined positive voltage threshold.

3. The apparatus as set forth in claim 1, wherein said encoding means encodes a logical zero by causing said first driver means to drive the first pair of electrical signals with a negative difference that is more negative than a predetermined negative voltage threshold.

4. The apparatus as set forth in claim 1, wherein, said encoding means encodes a "connected" state by causing said first driver means to drive the first pair of electrical signals simultaneously greater than a predetermined single ended voltage ($V_{se0}$) for a predetermined duration.

5. The apparatus as set forth in claim 1, wherein, said encoding means encodes a "disconnected" state by causing said first driver means to drive the first pair of electrical signals simultaneously smaller than a predetermined single ended voltage ($V_{se0}$) for a predetermined duration.

6. The apparatus as set forth in claim 1, wherein, said encoding means encodes a start of packet demarcation by causing said first driver means to drive the first pair of electrical signals simultaneously smaller than a predetermined single ended voltage ($V_{se0}$) for a predetermined duration.

7. The apparatus as set forth in claim 1, wherein, said encoding means encodes an end of packet demarcation by causing said first driver means to drive the first pair of electrical signals simultaneously smaller than a predetermined single ended voltage ($V_{se0}$) for a predetermined duration.

8. The apparatus as set forth in claim 1, wherein, said encoding means encodes a "connected" state by causing said first driver means to drive the first pair of electrical signals simultaneously greater than a predetermined single ended voltage ($V_{se0}$) for a first predetermined duration; and said encoding means encodes a "disconnected" state by causing said first driver means to drive the first pair of electrical signals simultaneously smaller than the predetermined single ended voltage ($V_{se0}$) for the first predetermined duration.

9. The apparatus as set forth in claim 8, wherein, said encoding means encodes a start of packet demarcation by causing said first driver means to drive the first pair of electrical signals simultaneously smaller than the predetermined single ended voltage ($V_{se0}$) for a second predetermined duration, the second predetermined duration being shorter than the first predetermined duration; and said encoding means encodes an end of packet demarcation by causing said first driver means to drive the first pair of electrical signals simultaneously smaller than the predetermined single ended voltage ($V_{se0}$) for a third predetermined duration, the third predetermined duration being shorter than the second predetermined duration.

10. In a computer system comprising a serial bus assembly having a plurality of serial bus elements, a method for the serial bus elements to electrically represent data and control states to each other, said method comprising the steps of:

a) driving a first pair of electrical signals in selected ones of voltage states for selected ones of time durations in a differential manner over a first pair of signal wires disposed in a first cable interconnecting a first and a second serial bus element by the first serial bus element;

b) controlling the electrical signal driving performed in step (a) to encode data and control states in the first pair of electrical signals by the first serial bus element;

c) receiving the first pair of electrical signals, and in response, outputting difference signals, by the second serial bus element; and d) decoding the difference signals by the second serial bus element.

11. The method as set forth in claim 10, wherein step (a) comprises driving the first pair of electrical signals with a positive difference greater than a predetermined positive voltage threshold by the first serial bus element to represent a logical one value, and driving the first pair of electrical signals with a negative difference that is more negative than a predetermined negative voltage threshold by the first serial bus element to represent a logical zero value.

12. The method as set forth in claim 11, wherein, step (a) comprises driving the first pair of electrical signals simultaneously greater than a predetermined single ended voltage ($V_{se0}$) for a first predetermined duration by the first serial bus element to represent a "connected" state, and driving the first pair of electrical signals simultaneously smaller than the predetermined single ended voltage ($V_{se0}$) for the first predetermined duration by the first serial bus element to represent a "disconnected" state.

13. The method as set forth in claim 12, wherein, step (a) comprises driving the first pair of electrical signals simultaneously smaller than the predetermined single ended voltage ($V_{se0}$) for a second predetermined duration by the first serial bus element to represent a start of packet demarcation, the second predetermined duration being shorter than the first predetermined duration, and driving the first pair of electrical signals simultaneously smaller than the predetermined single ended voltage ($V_{se0}$) for a third predetermined duration by the first serial bus element to represent an end of packet demarcation, the third predetermined duration being shorter than the second predetermined duration.

14. A bus controller for incorporation into a serial bus assembly having at least one other serial bus element, the bus controller comprising:

first driver means for driving a first pair of electrical signals in selected ones of voltage states for selected ones of time durations in a differential manner over a first pair of signal wires disposed in a first cable interconnecting the bus controller to a first of the at least one other serial bus element;

encoding means coupled to the first driver means for controlling the first driver means thereby encoding data and control states in the first pair of electrical signals;

second driver means for receiving a second pair of electrical signals in selected ones of the voltage states for selected ones of the time durations also in a differential manner over the first pair of signal wires from the first of the at least one other bus element, and in response, outputting difference signals; and decoding means coupled to the second driver means for receiving and decoding the difference signals.

15. The bus controller as set forth in claim 14, wherein said encoding means encodes a logical one by causing said first driver means to drive the first pair of electrical signals with a positive difference greater than a predetermined positive voltage threshold; and said encoding means encodes a logical zero by causing said first driver means to drive the first pair of electrical signals with a negative difference that is more negative than a predetermined negative voltage threshold.

16. The bus controller as set forth in claim 14, wherein, said encoding means encodes a "connected" state by causing said first driver means to drive the first pair of electrical signals simultaneously greater than a predetermined single ended voltage ($V_{se0}$) for a first predetermined duration; and said encoding means encodes a "disconnected" state by causing said first driver means to drive the first pair of electrical signals simultaneously smaller than the predetermined single ended voltage ($V_{se0}$) for the first predetermined duration.

17. The bus controller as set forth in claim 16, wherein, said encoding means encodes a start of packet demarcation by causing said first driver means to drive the first pair of electrical signals simultaneously smaller than the predetermined single ended voltage ($V_{se0}$) for a second predetermined duration, the second predetermined duration being shorter than the first predetermined duration; and said encoding means encodes an end of packet demarcation by causing said first driver means to drive the first pair of electrical signals simultaneously smaller than the predetermined single ended voltage ($V_{se0}$) for a third predetermined duration, the third predetermined duration being shorter than the second predetermined duration.

18. A bus signal distributor for incorporation into a serial bus assembly having at least one other bus element, the bus signal distributor comprising:

first driver means for driving a first pair of electrical signals in selected ones of voltage states for selected ones of time durations in a differential manner over a first pair of signal wires disposed in a first cable interconnecting the bus signal distributor to a first of the at least one other bus element;

encoding means coupled to the first driver means for controlling the first driver means thereby encoding data and control states in the first pair of electrical signals;

second driver means for receiving a second pair of electrical signals in selected ones of the voltage states for selected ones of the time durations also in a differential manner over the first pair of signal wires from the first of the at least one other bus element, and in response, outputting difference signals; and decoding means coupled to the second driver means for receiving and decoding the difference signals.

19. The bus signal distributor as set forth in claim 18, wherein said encoding means encodes a logical one by causing said first driver means to drive the first pair of electrical signals with a positive difference greater than a predetermined positive voltage threshold; and said encoding means encodes a logical zero by causing said first driver means to drive the first pair of electrical signals with a negative difference that is more negative than a predetermined negative voltage threshold.

20. The bus signal distributor as set forth in claim 18, wherein, said encoding means encodes a "connected" state by causing said first driver means to drive the first pair of electrical signals simultaneously greater than a predetermined single ended voltage ($V_{se0}$) for a first predetermined duration; and said encoding means encodes a "disconnected" state by causing said first driver means to drive the first pair of electrical signals simultaneously smaller than the predetermined single ended voltage ($V_{se0}$) for the first predetermined duration.

21. The bus signal distributor as set forth in claim 20, wherein, said encoding means encodes a start of packet demarcation by causing said first driver means to drive the first pair of electrical signals simultaneously smaller than the predetermined single ended voltage ($V_{se0}$) for a second predetermined duration, the second predetermined duration being shorter than the first predetermined duration; and said encoding means encodes an end of packet demarcation by causing said first driver means to drive the first pair of electrical signals simultaneously smaller than the predetermined single ended voltage ($V_{se0}$) for a third predetermined duration, the third predetermined duration being shorter than the second predetermined duration.

22. A bus interface for incorporation into a serial bus assembly having at least one other serial bus element, the bus interface comprising:

first driver means for driving a first pair of electrical signals in selected ones of voltage states for selected ones of time durations in a differential manner over a first pair of signal wires disposed in a first cable interconnecting the bus interface to the first of the at least one other serial bus element;

encoding means coupled to the first driver means for controlling the first driver means thereby encoding data and control states in the first pair of electrical signals;

second driver means for receiving a second pair of electrical signals in selected ones of the voltage states for selected ones of the time durations also in a differential manner over the first pair of signal wires from the first of the at least one other serial bus element, and in response, outputting difference signals; and decoding means coupled to the second driver means for receiving and decoding the difference signals.

23. The bus interface as set forth in claim 22, wherein said encoding means encodes a logical one by causing said first driver means to drive the first pair of electrical signals with a positive difference greater than a predetermined positive voltage threshold; and said encoding means encodes a logical zero by causing said first driver means to drive the first pair of electrical signals with a negative difference that is more negative than a predetermined negative voltage threshold.

24. The bus interface as set forth in claim 22, wherein, said encoding means encodes a "connected" state by causing said first driver means to drive the first pair of electrical signals simultaneously greater than a predetermined single ended voltage ($V_{se0}$) for a first predetermined duration; and said encoding means encodes a "disconnected" state by causing said first driver means to drive the first pair of electrical signals simultaneously smaller than the predetermined single ended voltage ($V_{se0}$) for the first predetermined duration.

25. The bus interface as set forth in claim 24, wherein, said encoding means encodes a start of packet demarcation by causing said first driver means to drive the first pair of electrical signals simultaneously smaller than the predetermined single ended voltage ($V_{se0}$) for a second predetermined duration, the second predetermined duration being shorter than the first predetermined duration; and said encoding means encodes an end of packet demarcation by causing said first driver means to drive the first pair of electrical signals simultaneously smaller than the predetermined single ended voltage ($V_{se0}$) for a third predetermined duration, the third predetermined duration being shorter than the second predetermined duration.

\* \* \* \* \*

UNITED STATES PATENT AND TRADEMARK OFFICE
CERTIFICATE OF CORRECTION

PATENT NO. : 5,621,901
APPLICATION NO. : 08/332337
DATED : April 15, 1997
INVENTOR(S) : Jeff C. Morriss and Andrew M. Volk It is certified that error appears in the above-identified patent and that said Letters Patent is hereby corrected as shown below:

In the drawings, sheet 14, replace the second Fig. 14 with Fig. 17.

Signed and Sealed this

Fourth Day of September, 2007

JON W. DUDAS
*Director of the United States Patent and Trademark Office*